(12) United States Patent
Gumpoltsberger

(10) Patent No.: US 8,182,388 B2
(45) Date of Patent: May 22, 2012

(54) DUAL-CLUTCH TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 819 days.

(21) Appl. No.: 12/306,144

(22) PCT Filed: Jun. 18, 2007

(86) PCT No.: PCT/EP2007/056012
§ 371 (c)(1),
(2), (4) Date: Dec. 22, 2008

(87) PCT Pub. No.: WO2007/147800
PCT Pub. Date: Dec. 27, 2007

(65) Prior Publication Data
US 2009/0280942 A1    Nov. 12, 2009

(30) Foreign Application Priority Data
Jun. 23, 2006    (DE) .................. 10 2006 028 798

(51) Int. Cl.
*F16H 37/06* (2006.01)

(52) U.S. Cl. .......................... 475/330; 74/664

(58) Field of Classification Search .............. 475/207, 475/219–221, 225, 329, 330, 343; 74/331, 74/356, 664
See application file for complete search history.

(56) References Cited

U.S. PATENT DOCUMENTS

| | | | | |
|---|---|---|---|---|
| 5,997,433 A | * | 12/1999 | Domian et al. | 477/98 |
| 6,645,114 B1 | * | 11/2003 | Biallas | 475/271 |
| 7,464,616 B2 | * | 12/2008 | Leibbrandt et al. | 74/331 |
| 7,699,744 B2 | * | 4/2010 | Lepelletier | 475/278 |
| 2006/0169078 A1 | * | 8/2006 | Hiraiwa | 74/331 |

FOREIGN PATENT DOCUMENTS

| | | |
|---|---|---|
| DE | 100 33 476 A1 | 5/2001 |
| DE | 10260179 A1 * | 7/2004 |
| DE | 10 2004 001278 A1 | 8/2005 |
| DE | 10 2004 014 082 A1 | 10/2005 |
| EP | 0 434 525 A1 | 6/1991 |
| EP | 1 422 441 A2 | 5/2004 |
| EP | 1 422 448 A2 | 5/2004 |
| EP | 1 424 510 A2 | 6/2004 |
| EP | 1 424 511 A2 | 6/2004 |
| EP | 1 566 570 A1 | 8/2005 |
| EP | 1 566 574 A1 | 8/2005 |
| EP | 1 647 736 A | 4/2006 |
| JP | 2005 23987 | 1/2005 |
| WO | 2005 050060 A1 | 6/2005 |

* cited by examiner

*Primary Examiner* — Justin Holmes
(74) *Attorney, Agent, or Firm* — Davis & Bujold, P.L.L.C.

(57) ABSTRACT

A dual clutch transmission for a front-transverse arrangement including a dual clutch and two partial transmissions (PG1, PG2). Each of the two clutches (K1, K2) of the dual clutch acts on one coaxial transmission input shaft (AW1, AW2), which acts upon a partial transmission (PG1, PG2). The partial transmissions are designed as planetary transmissions (PG1, PG2) that are to be shifted in a positive manner. The output is located on the same side of the transmission as the input and is axially parallel to the input in the same rotational direction. Torque is transmitted through the dual clutch transmission to the output shaft (Ab) by way of at least one intermediate shaft (W1, W2) that is parallel to the transmission input shafts (AW1, AW2).

19 Claims, 13 Drawing Sheets

| | K1 | K2 | s1 | s2 | s3 | s4 | s5 | s6 | sr1 | sr2 | i | phi |
|---|---|---|---|---|---|---|---|---|---|---|---|---|
| 1. GEAR | x | | x | o | | | | | | | 7.0 | 1.8 |
| 2. GEAR | | x | o | x | o | | | | | | 3.9 | 1.6 |
| 3. GEAR | x | | | o | x | o | | | | | 2.4 | 1.4 |
| 4. GEAR | | x | | | o | x | o | | | | 1.7 | 1.2 |
| 5. GEAR | x | | | | | o | x | o | | | 1.4 | 1.4 |
| 6. GEAR | | x | | | | | o | x | | | 1.0 | |
| R1. GEAR | x | | | o | | | | | x | o | -6.3 | -0.9 |
| R2. GEAR | | x | o | | | | | | o | x | -3.2 | -0.8 |

| | K1 | K2 | s1 | s2 | s3 | s4 | s5 | s6 | sr1 | i | phi |
|---|---|---|---|---|---|---|---|---|---|---|---|
| 1. GEAR | x | | x | o | | | | | | 6.9 | 1.8 |
| 2. GEAR | | x | o | x | o | | | | | 3.9 | 1.5 |
| 3. GEAR | x | | | o | x | o | | | | 2.5 | 1.4 |
| 4. GEAR | | x | | | o | x | o | | | 1.7 | 1.2 |
| 5. GEAR | x | | | | | o | x | o | | 1.4 | 1.4 |
| 6. GEAR | | x | | | | | o | x | | 1.0 | |
| R1. GEAR | x | | | o | | | | | x | -5.1 | -0.7 |

DUAL-CLUTCH TRANSMISSION

This application is a national stage completion of PCT/EP2007/056012 filed Jun. 18, 2007 which claims priority from German Application Serial No. DE 10 2006 028 798.3 filed Jun. 23, 2006.

FIELD OF THE INVENTION

The present invention pertains to a dual clutch transmission.

BACKGROUND OF THE INVENTION

Present-day automatic transmissions for a front-transverse arrangement in a motor vehicle comprise either an upstream converter and a downstream, power-shift planetary transmission or a dual clutch transmission.

The installation space for this drive train arrangement is so limited that the arrangement of the required elements has to be as compact as possible to produce the transmission ratios. This pertains in particular to the installation length of the transmission, since the installation space for a transverse installation is very limited. Furthermore, the efficiency of the transmission is a very important criterion, whereas due to their configuration, dual clutch transmissions have an advantage over conventional planetary transmissions with regard to power losses due to both tooth friction and clutch plate slip. The reason for this is that in a dual clutch transmission, two gears must be engaged, whereas in a planetary transmission two gears must be engaged and in, addition, planetary transmission losses lessen the efficiency in comparison to a dual clutch transmission. Furthermore, a dual clutch transmission has lower slip losses than a planetary transmission, since in the case of a dual clutch transmission, one disengaging power-shift clutch is provided, in comparison to at least three disengaging power-shift clutches in the planetary transmission.

Planetary transmissions in a front-transverse design for passenger vehicles usually have a converter as start-up element and comprise at least two planetary gear sets and at least five power-shift elements, which usually are designed as clutch plates/brakes; as a rule, up to six forward gears and one reverse gear can be implemented. In this case, the planetary transmission can be positioned either fully coaxially to the drive shaft, or as a quasi-group transmission (as a rule, 5-gear transmission) with a primary transmission arranged coaxially to the drive shaft and one rear-mounted gear set arranged on a secondary shaft.

A transmission with a planetary design is disclosed in the document EP 0 434 525 B1, which comprises essentially a drive shaft and an output shaft that are arranged parallel to each other, a dual planetary gear set that is arranged concentric to the output shaft, and five shift elements in the form of three clutches and two brakes, whose optional locking in pairs determines the different gear transmission ratios between the drive shaft and the output shaft. In this case, the transmission has a front-mounted gear set and two power paths, so that due to selective, paired engaging of the five shifting elements, six forward gears can be realized.

A design comprising a secondary shaft is known, for example from JP 2005-23987. In this case, the two gear sets of the primary gear set are arranged on two parallel shafts and are actuated jointly by means of two spur gear-drives or two chain drives. The input torque is applied to the two stated shafts by means of a transmission input shaft actively connected to the two stated shafts by means of a spur gear drive, and the torque is transmitted to the pertinent elements of the planetary gear sets by means of the shifting elements according to the shifting logic.

Furthermore, from the prior art a dual clutch transmission with a countershaft gearbox design is known, in which the dual clutch is used as a start-up and shifting element; in this case, the countershaft gearbox can be positively shifted.

From document DE 10 2004 001 278 A1 a dual clutch transmission is known which has two input shafts, two clutches and at least one first and one second drive shaft, whereas the first input shaft can be actively connected to the first clutch and the second input shaft can be actively connected to the second clutch, and the first drive shaft is positioned below, and the second drive shaft is positioned above, the input shafts, or vice-versa, and the input shafts and drive shafts have mutually engaged toothed gears and at least two toothed gears form one gear stage.

In this case at least one toothed gear of a gear stage is designed as an engaging and/or disengaging loose wheel and the other toothed gear is designed as a fixed wheel; furthermore, each drive shaft has one driven toothed gear to transfer the torque to the axle drive, whereas to implement the reverse gear, an additional shaft is provided which is designed as a third drive shaft.

From the prior art dual-clutch transmissions are also known with an outlet-connected planetary transmission, however these are not suitable for a standard drive and also not for a front-transverse arrangement.

For example, document EP 1 422 441 A2 discloses a family of multiple gear planetary transmissions with a dual clutch. A transmission of this kind comprises an input shaft and an output shaft, a first, a second, a third and a fourth planetary gear set, whereas the planetary gear sets each have three elements, whereas a first shaft permanently connects a first element of the first planetary gear set to a first element of the second planetary gear set, a second shaft permanently connects a second element of the first planetary gear set to a second element of the second planetary gear set, a third shaft permanently connects one element of the first or second planetary gear set to a first element of the third planetary gear set and of the output shaft, and whereas a fourth shaft permanently connects a second element of the third planetary gear set to a first element of the fourth planetary gear set. Furthermore, a first clutch is connected to the input shaft and a second clutch connects the input shaft to a third element of the third planetary gear set.

The transmissions described in EP 1 422 441 A2 also comprise a first and a second torque transmission mechanism, such that the torque transmission mechanisms optionally connect elements of the first and of the second planetary gear set to the first clutch. Furthermore, a third and a fourth torque transmission mechanism are provided, these torque transmission mechanisms optionally connect elements of the third planetary gear set to elements of the fourth planetary gear set; a fifth and a sixth torque transmission mechanism also connect operational elements of the first or second planetary gear set to a fixed-housing element, whereas a seventh torque transmission mechanism detachably connects one element of the fourth planetary gear set to the fixed-housing element. Furthermore, an eighth torque transmission mechanism is provided which optionally connects one element of the first or the second planetary gear set to the first clutch, or one element of the fourth planetary gear set to the fixed-housing element.

Additional dual clutch transmissions with downstream planetary gear transmissions are known for a standard arrangement, for example, from EP 1 422 448 A2, EP 1 424 510 A2, EP 1 424 511 A2, EP 1 566 570 A1 and from EP 1 566 574 A1.

Known from the Applicant's prior application DE 10 2004 014 082 A1 is a dual clutch transmission with a planetary design, with several planetary gear sets, at least two friction-locked shift elements for shifting to different power paths in a force flux, and several positive shift elements for selecting of different transmission stages in the power path. In this case, the friction-locked shift elements and the positive shift elements are arranged between the shafts of the planetary gear sets, a housing and also a transmission input shaft and a transmission output shaft, so that changes to gear stages can be performed at least in one lower gear stage range by means of the friction-locked shifting elements without interrupting the traction. At least one of the friction-locked shifting elements is designed as a clutch, and the second planetary gear set, a third planetary gear set and a fourth planetary gear set form a 3-stage-5-shaft transmission unit which is designed with separate planetary gears.

An additional dual clutch transmission for a standard arrangement comprising a planetary transmission is described within the scope of WO 2005/050060 A1. It comprises a drive shaft and an output shaft which are connected together by means of at least two power paths. One power path has at least two transmission ratios and these transmission ratios are different. Furthermore, the drive shaft is permanently connected to the input shafts of the power paths.

The object of the present invention is to specify a power-shifting dual-clutch transmission which has a very compact design and is suitable for a front-transverse arrangement. Furthermore, the transmission according to the invention can be produced at low cost and has a small power loss.

SUMMARY OF THE INVENTION

Accordingly, a dual clutch transmission for a front-transverse arrangement is proposed, comprising a dual clutch and two partial transmissions. Each of the two clutches of the dual clutch acts on one coaxial transmission input shaft, which acts upon a partial transmission, in which the partial transmissions are designed as planetary transmissions that are to be shifted in a positive manner. The output is performed on the same side of the transmission as the input and axially parallel to the input in the same rotational direction.

In this regard, the torque is transmitted to the output shaft by means of at least one intermediate shaft that runs parallel to the transmission input shafts. The gears of the planetary transmission are not shifted by means of power-shifted disk shifting elements, but rather by friction-locked shifting elements, for example, with synchronism elements or with claw clutches.

According to the invention, at least one spur gear stage and/or spur gear ratio is associated with each partial transmission, so that the sets of transmission ratios will correspond to the requirements placed on multi-gear transmissions.

The flow of power proceeds from the engine through an optional element for reducing the rotary oscillation across an optional hydraulic torque converter or a hydraulic clutch into the dual clutch. The latter is designed preferably as a dual clutch module. However, it can also be designed as a "stand-alone" dual clutch composed of two clutches arranged at different locations in the transmission.

Each clutch of the dual clutch acts on a coaxial transmission input shaft, which acts on a planetary transmission, and a spur gear stage can optionally be arranged in the direction of force flux in front of the particular planetary transmission.

The torque is transferred by the spur gear stages to an intermediate shaft arranged coaxially to the other shafts. If a spur gear stage is arranged in the direction of the flow of force in front of its associated planetary transmission, then the planetary transmission is arranged on the intermediate shaft parallel to the drive axle. If the spur gear stages are positioned in the direction of the flow of force after the planetary transmissions, then the planetary transmission is positioned on the output axle.

If the spur gear stages are arranged in the direction of the flow of force in front of the two planetary transmissions, then the planetary transmissions can be arranged either on the same intermediate shaft parallel to the drive axle, or can be arranged on two different (but parallel) intermediate shafts.

In the case of a single intermediate axle/shaft, an additional spur gear stage is provided which connects the intermediate shaft to the output shaft. In the case that two different intermediate axles are provided, then two additional spur gear stages are required to ensure the linkage of the additional intermediate axles to the output shaft (that is, one additional spur gear stage is provided per intermediate axle).

In comparison to the conventional dual clutch transmission, two planetary transmissions take over the job of the two partial transmissions in the inventive transmission. In this case, one planetary transmission represents the partial transmission with the uneven gears, whereas the additional planetary transmission in this case represents the second partial transmission with the even gears.

The mode of operation for shifting of the different gears does not differ from the mode of operation of conventional dual clutch transmissions. For example, the individual gears are prepared in the partial transmissions and are shifted by the change of clutch in the double clutch. In this case the planetary transmissions as partial transmissions each have one half of the needed forward gears, and one planetary transmission represents either the even or the uneven gears. Furthermore, one or several reverse gears can be provided.

The partial transmission gears are shifted simultaneously by operation of one or even several shifting elements. These elements connect either one planetary transmission shaft to another available shaft or one planetary transmission shaft to the housing.

The invention satisfies the requirements for a front-transverse arrangement, that is, an output parallel to the axle with the same direction of rotation and the shortest possible design is realized. In addition, the transmission ratios correspond to the requirements placed on multi-gear transmissions. This is achieved, in part, by the spur gear transmission ratios associated with each partial transmission.

The output wheel and/or the output wheels are linked to a differential which ensures either the speed compensation between right and left driven wheel (for a pure front-drive) or ensures the speed compensation between front and rear axle (all-wheel drive). Optionally, the speed compensation can also be handled by clutches.

The used planetary transmissions comprise at least one planetary gear set of conventional design, and the planetary gear set can be designed as planar plus- or minus-planetary gear sets or as multiple-stage planetary gear sets. They can be shifted either with synchronization elements or with claw clutches.

BRIEF DESCRIPTION OF THE DRAWINGS

The invention will be explained in greater detail below based on the attached figures in which.

DETAILED DESCRIPTION OF THE INVENTION

Figure 1:
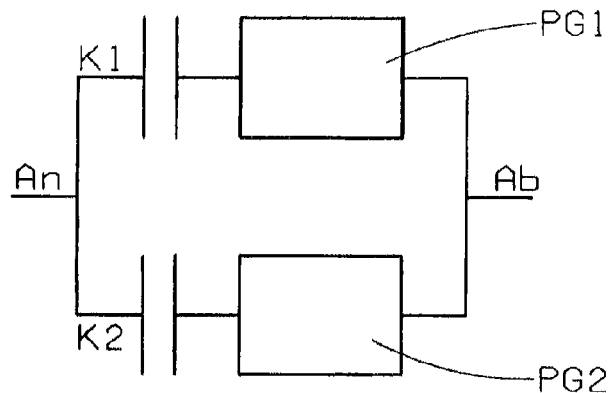
FIG. 1 is a schematic illustration of the basic design of a transmission according to the invention.

FIG. 1 illustrates the fundamental design of a transmission according to the invention. Accordingly, the transmission comprises a drive shaft An, an output shaft Ab, a dual clutch comprising the clutches K1 and K2, and at least two positive-shifted partial transmissions which are designed as planetary transmissions PG1 and/or PG2.

According to the invention, at least one spur gear stage and/or spur gear transmission ratio is associated with each partial transmission, so that the transmission ratios correspond to the requirements placed on multi-gear transmissions. Different possibilities for the fundamental arrangement of the spur gear stages are the subject matter of FIGS. 2 to 6.

Figure 2:
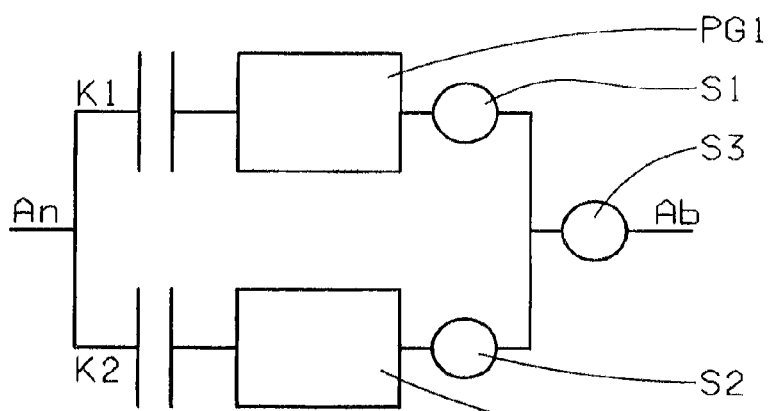
FIG. 2 is a schematic illustration of the basic design of a transmission according to the invention, and also of the arrangement of the spur gear stages in the direction of force flow according to the planetary transmissions.

In the arrangement according to FIG. 2, two spur gear stages S1 and S2 are provided which are associated with the planetary transmissions PG1 and/or PG2, whereas the spur gear stages are arranged in the direction of force flow after the planetary transmissions. Furthermore, an additional spur gear stage S3 is provided which connects one intermediate shaft to the output shaft Ab.

Figure 3:
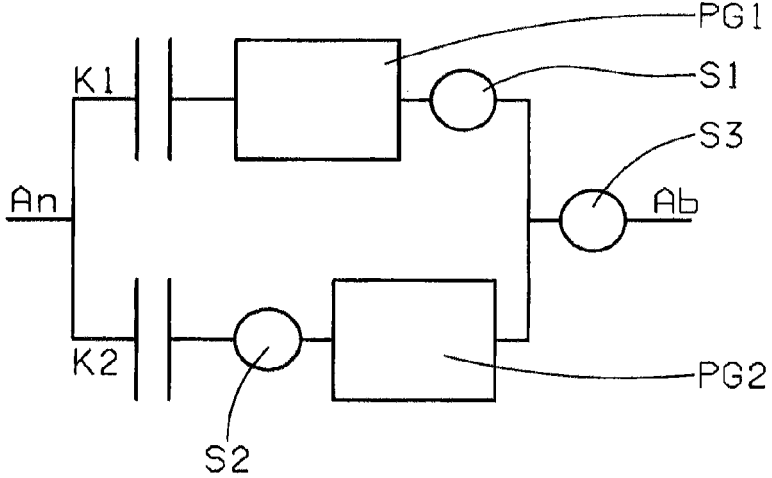
FIG. 3 is a schematic illustration of the basic design of a transmission according to the invention, and also of another possibility for arrangement of the spur gear stages.

The arrangement shown in FIG. 3 differs from the arrangement according to FIG. 2 in that the spur gear stage S2 associated with the planetary transmission PG2 is arranged in the direction of force flow in front of the planetary transmission PG2. In this case, the planetary transmission PG2 is arranged on a second axle parallel to the drive axle, which connects the output shaft Ab by means of the spur gear stage S3.

Figure 4:
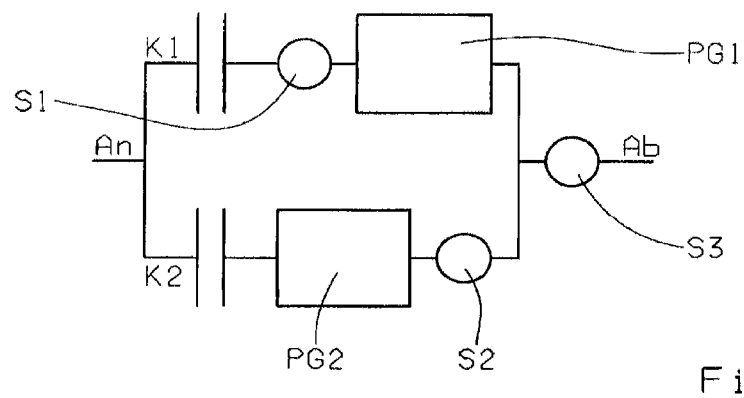
FIG. 4 is a schematic illustration of the basic design of a transmission according to the invention, and also of another possibility for arrangement of the spur gear stages.

In the arrangement according to FIG. 4, the difference to the arrangement according to FIG. 2 consists in that the spur gear stage S1 associated with the planetary transmission PG1 is located in the direction of force flow in front of the planetary transmission PG1. In this case the planetary transmission PG1 is located on a second axle parallel to the drive axle which is connected to the output shaft Ab by means of the spur gear stage S3.

Figure 5:
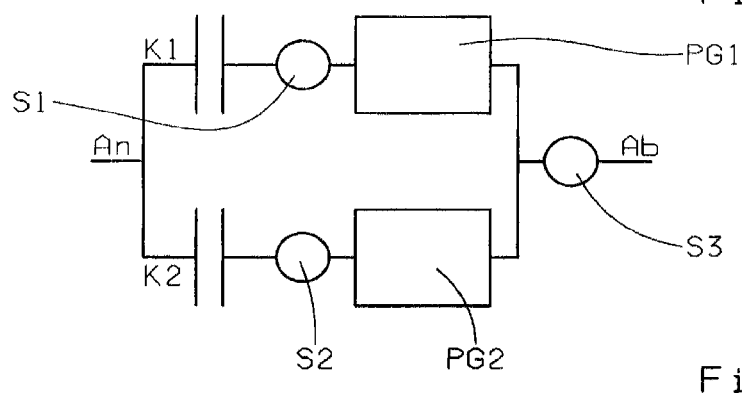
FIG. 5 is a schematic illustration of the basic design of a transmission according to the invention and also of the arrangement of the spur gear stages in the direction of force flow in front of the planetary transmissions.
Figure 6:
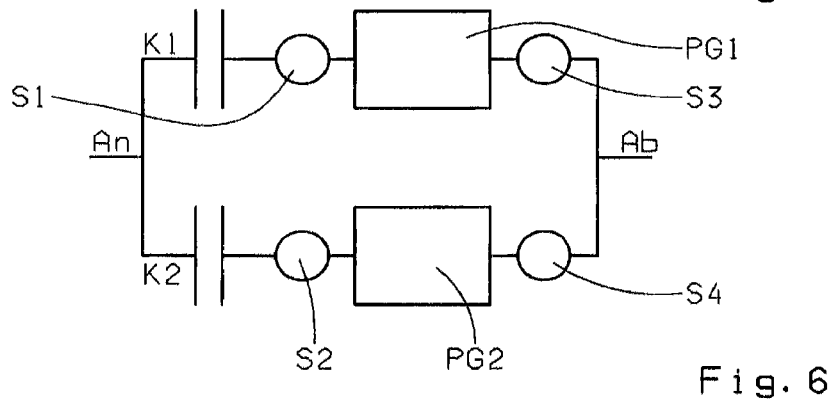
FIG. 6 is a schematic illustration of the basic design of a transmission according to the invention and also of the arrangement of the spur gear stages in the direction of force flow in front of and behind the planetary transmissions.

According to FIG. 5, the spur gear stages S1 and S2 associated with the planetary transmissions are positioned in the direction of force flow in front of the planetary transmissions. In this case, the planetary transmissions can be arranged either on the same intermediate axle located parallel to the drive axle (see FIGS. 17, 18, 19, 20), or can be arranged on two different, parallel intermediate axles, as explained based on FIGS. 21, 22, 23 and 24. In the case that two different intermediate axles are provided, as shown in FIG. 6, an additional spur gear stage S4 is required, in order to ensure the connection of the additional intermediate axle to the output shaft.

Figure 7:
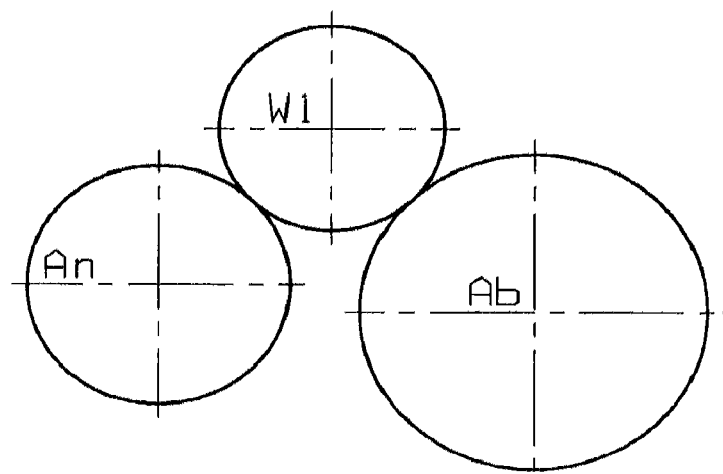
FIG. 7 is a schematic illustration of the arrangement of shafts in a three-shaft arrangement.
Figure 8:
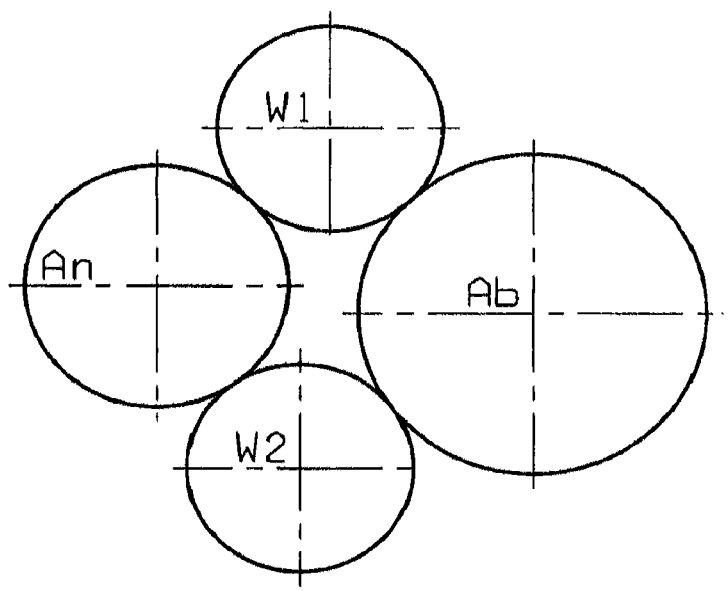
FIG. 8 is a schematic illustration of the arrangement of shafts in a four-shaft arrangement.

Accordingly, the transmission according to the invention can have—in addition to the shafts connected in a rotationally fixed manner to the two clutches K1 and K2—three or four shafts, namely the drive shaft An, the output shaft Ab, an intermediate shaft W1, and—depending on the arrangement of the planetary transmission—an additional intermediate shaft W2. This is the subject matter of FIGS. 7 and 8, whereas FIG. 7 represents a three-shaft arrangement and FIG. 8 a four-shaft arrangement.

Figure 9:
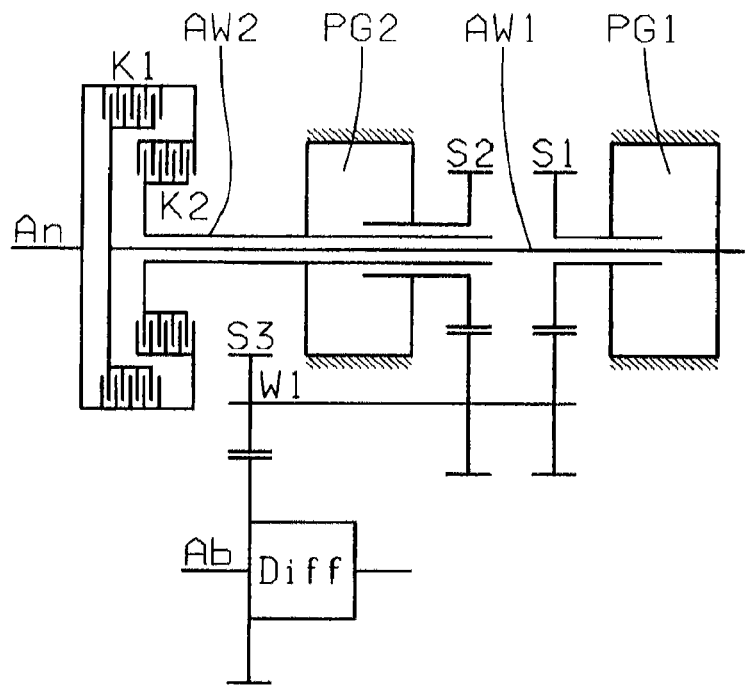
FIG. 9 is a schematic illustration of a first design embodiment of a transmission according to the invention.

FIG. 9 schematically illustrates a first embodiment of a transmission according to the invention. It comprises a dual clutch with the clutches K1 and K2 and two partial transmissions which are designed as positive shifting planetary transmissions PG1, PG2. At least one spur gear stage and/or spur gear transmission ratio S1 and/or S2 is associated with each planetary transmission.

The two clutches K1, K2 of the double clutch each act on two coaxial transmission input shafts AW1 and/or AW2, which each act on one planetary transmission PG1 and/or PG2; the shaft AW1 is designed as a solid shaft and is arranged coaxially to the shaft AW2 designed as a hollow shaft. In the design embodiment shown in FIG. 9, the spur gear stages S1 and/or S2 associated with the planetary transmissions PG1, PG2 are arranged in the direction of force flow after the planetary transmissions (that is, they are connected to the output of the particular planetary transmission), whereas the spur gear stage S1, according to the figure, is arranged axially, or, when viewed spatially, is arranged to the left of the planetary transmission PG1, and the spur gear stage S2 is arranged axially, or, when viewed spatially, is arranged to the right of the planetary transmission PG2. As is evident in the figure, due to the spur gear stages S1 and S2, the torque is transferred to an intermediate shaft W1 arranged parallel to the drive shaft An, said intermediate shaft is actively connected to the output shaft Ab by means of an additional spur gear stage S3. The output shaft Ab and/or the output wheel is connected preferably to a differential Diff which ensures either the compensation of speed between the right and left driven wheel (pure front drive) or between the front- and rear axle (all-wheel drive). Optionally, the speed compensation can also be handled by clutches and/or by so-called hang-on systems.

Figure 10:
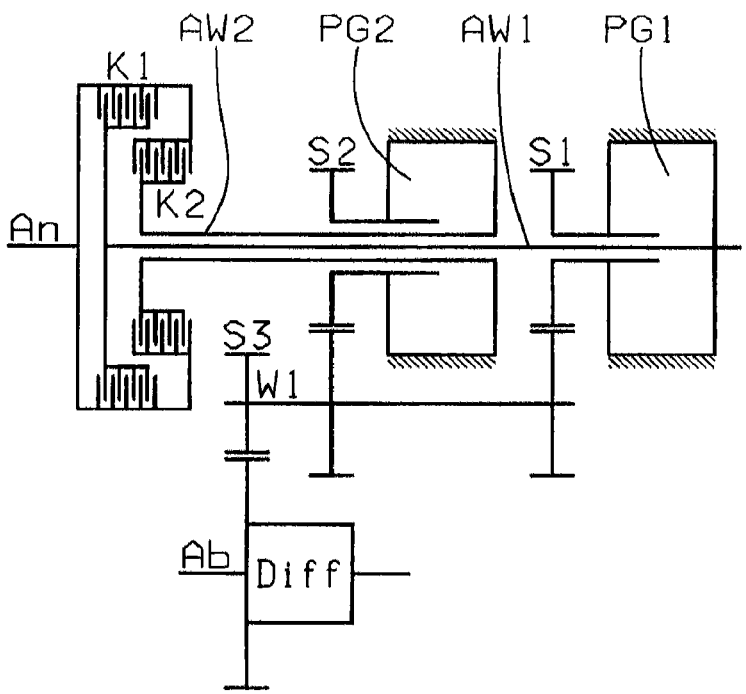
FIG. 10 is a schematic illustration of a second design embodiment of a transmission according to the invention.
Figure 11:
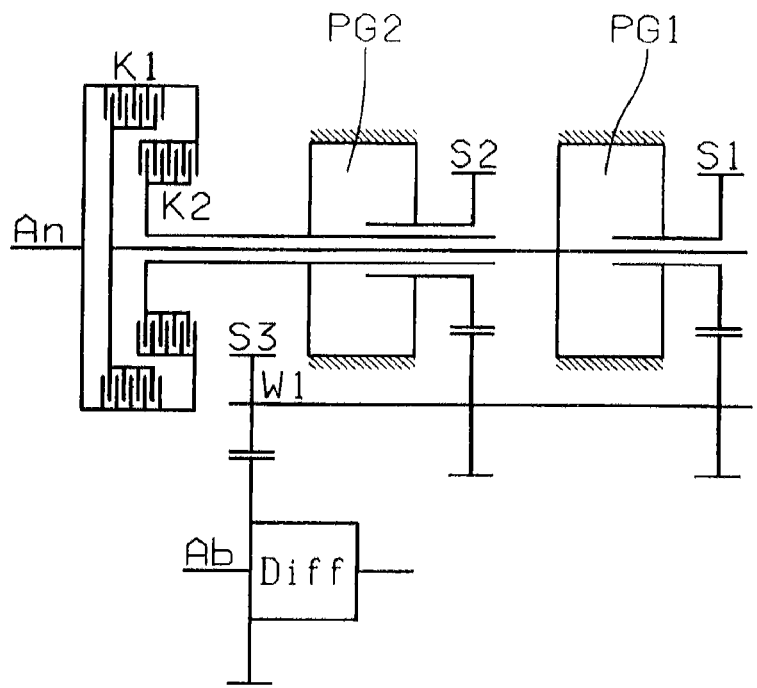
FIG. 11 is a schematic illustration of a third design embodiment of a transmission according to the invention.
Figure 12:
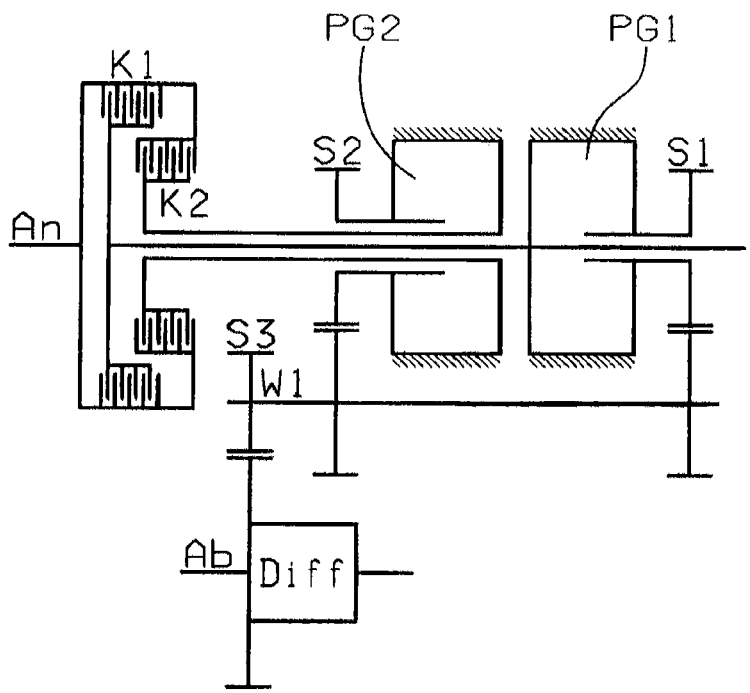
FIG. 12 is a schematic illustration of a fourth design embodiment of a transmission according to the invention.

The design embodiment illustrated in FIG. 10 differs from the design embodiment according to FIG. 9 in that the spur gear stage S2 associated with the planetary transmission PG2 is arranged axially, or, when viewed spatially, is arranged to the left of the planetary transmission PG2. According to the invention, the spur gear stages, when viewed in the direction of force flow, can be arranged after the planetary transmissions and when viewed axially or spatially, can be arranged to the right of the particular planetary transmission PG1 and/or PG2. This arrangement is the subject matter of FIG. 11; in the embodiment shown in FIG. 12, the spur gear stage S1 associated with the planetary transmission PG1 is arranged axially, or, when viewed spatially, is arranged to the right of the planetary transmission PG1, whereas the spur gear stage S2 associated with planetary transmission PG2 is arranged axially, or, when viewed spatially, is arranged to the left of planetary transmission PG2.

Within the scope of additional design embodiments of the invention, the spur gear stage associated with one planetary transmission can be arranged in the direction of force flow in front of the planetary transmission (that is, the planetary transmission is connected to the spur gear stage on the drive side). In this case, this planetary transmission is positioned on the intermediate shaft W1. FIGS. 13, 14, 15 and 16 illustrate design embodiments in which the transmission PG2 is arranged on the intermediate shaft S1; these design embodiments differ in the spatial arrangement of the spur gear stages S1, S2 relative to the planetary transmissions PG1, PG2.

Of course, instead of the planetary transmission PG2, the planetary transmission PG1 can be arranged on the intermediate shaft and the transmission PG2 can be arranged coaxial to the drive shaft instead of the transmission PG1.

Figure 13:
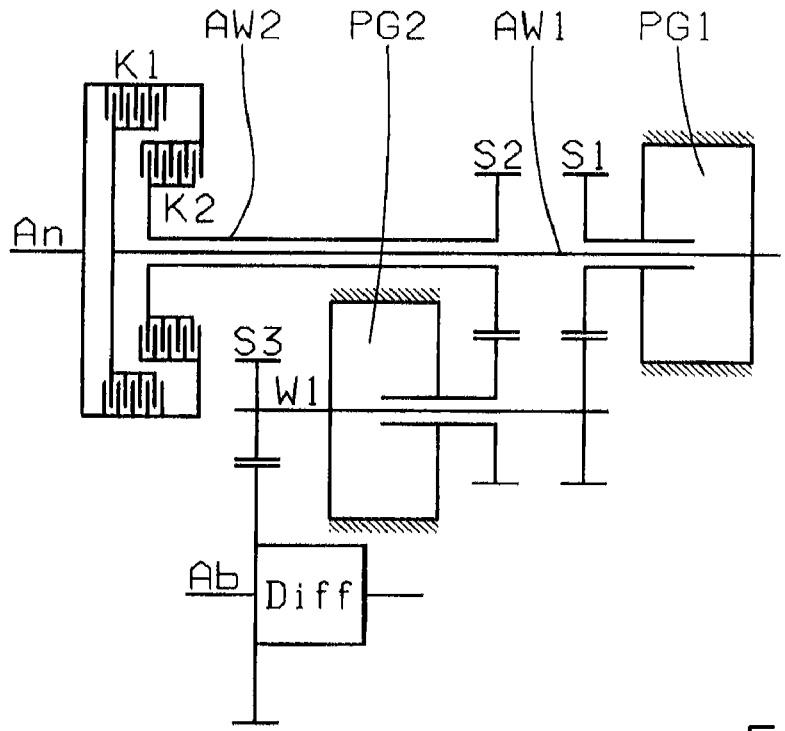
FIG. 13 is a schematic illustration of a fifth design embodiment of a transmission according to the invention.

In the design embodiment shown in FIG. 13 the spur gear stage S2 associated with the planetary transmission PG2 is arranged axially, and/or when viewed spatially, is arranged to the right of the planetary transmission PG2 (that is, after the planetary transmission), and the spur gear stage S1 associated with the planetary transmission PG1 is arranged in the direction of force flux after the planetary transmission PG1 and when viewed axially, is arranged to the left of the transmission PG1.

Figure 14:
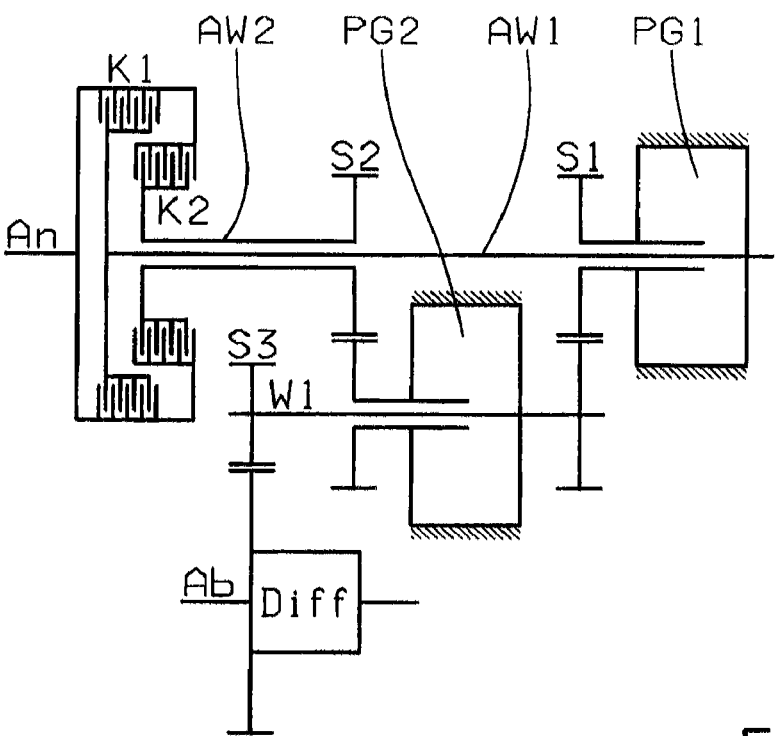
FIG. 14 is a schematic illustration of a sixth design embodiment of a transmission according to the invention.
Figure 15:
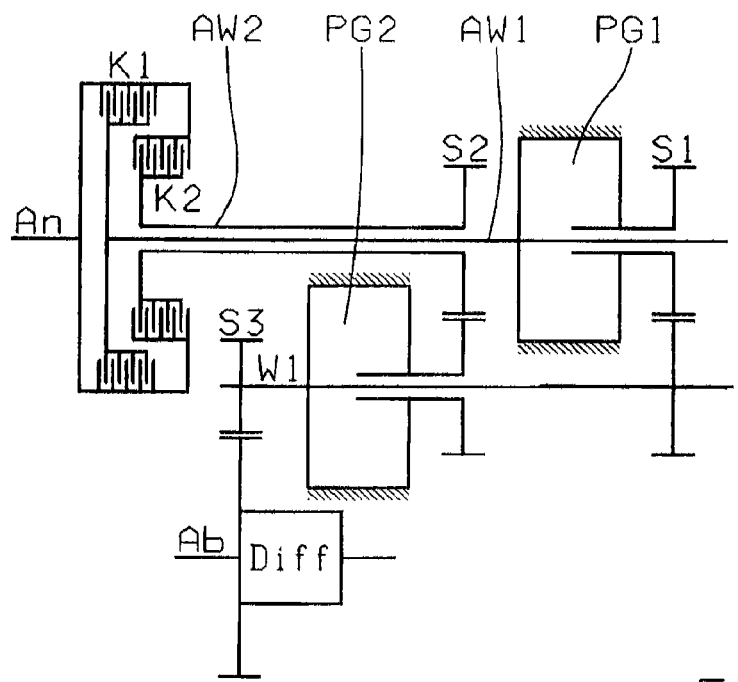
FIG. 15 is a schematic illustration of a seventh design embodiment of a transmission according to the invention.

The design embodiment shown in FIG. 14 differs from the design embodiment according to FIG. 13 in that the spur gear stage S2 associated with the planetary transmission PG2 is located axially, or, when viewed spatially, is arranged to the left of the planetary transmission PG2, and the design embodiment shown in FIG. 15 differs from the design embodiment according to FIG. 13 in that the spur gear stage S1 associated with the planetary transmission PG1 is arranged axially, or, when viewed spatially, is arranged to the right of the transmission PG1.

Figure 16:
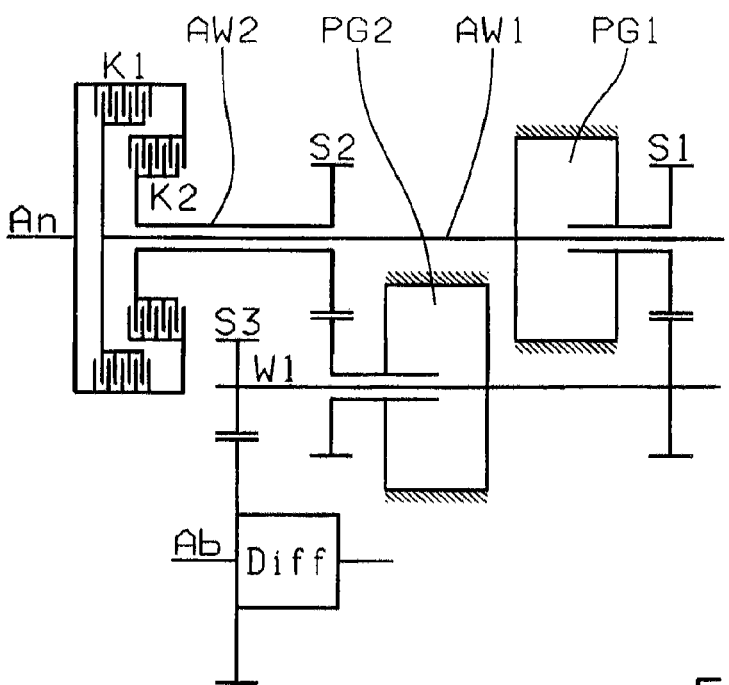
FIG. 16 is a schematic illustration of an eighth design embodiment of a transmission according to the invention.

Furthermore, FIG. 16 shows a transmission in which the spur gear stage S2 associated with the planetary transmission PG2 is arranged axially, or, when viewed spatially, is arranged to the left of the planetary transmission PG2, and the spur gear stage S1 associated with the planetary transmission PG1 is arranged axially, or, when viewed spatially, is arranged to the right of the planetary transmission PG1.

FIGS. 17, 18, 19 and 20 present design embodiments of the invented transmission in which the two planetary transmissions PG1, PG2 associated with the spur gear stages S1, S2 are arranged in the direction of force flow in front of the planetary transmissions PG1 and/or PG2 (that is, the planetary transmissions are connected on the drive side to the associated spur gear stage). In this case, the planetary drives PG1, PG2 are arranged on the same intermediate axle parallel to the drive axle. The illustrated design embodiments differ in spatial arrangement of the spur gear stages S1, S2 relative to the planetary transmissions PG1, PG2.

Figure 17:
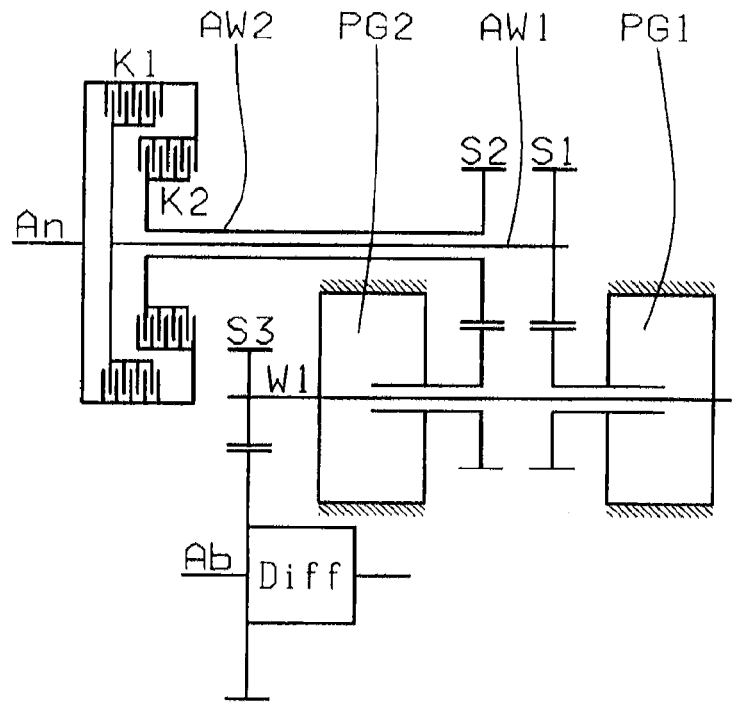
FIG. 17 is a schematic illustration of a ninth design embodiment of a transmission according to the invention.
Figure 18:
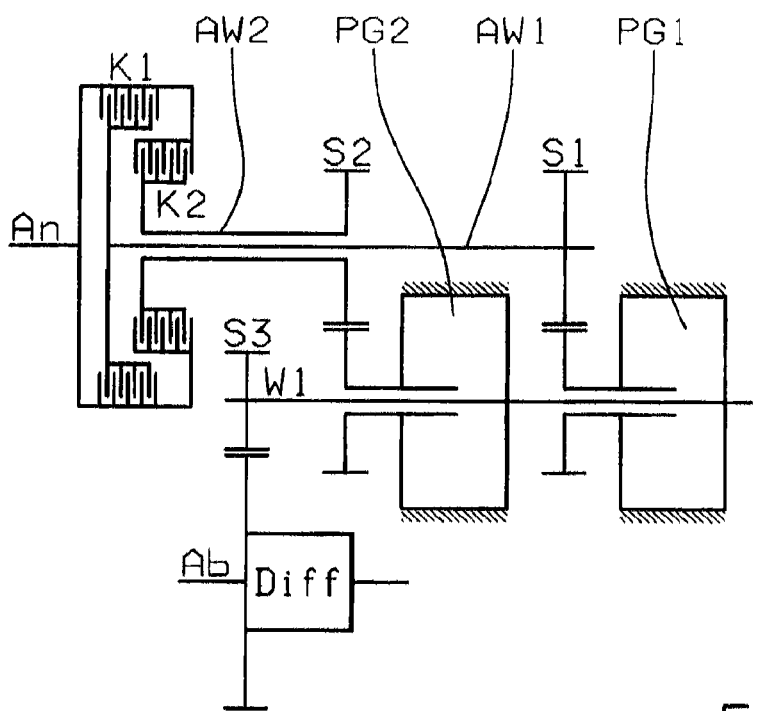
FIG. 18 is a schematic illustration of a tenth design embodiment of a transmission according to the invention.
Figure 19:
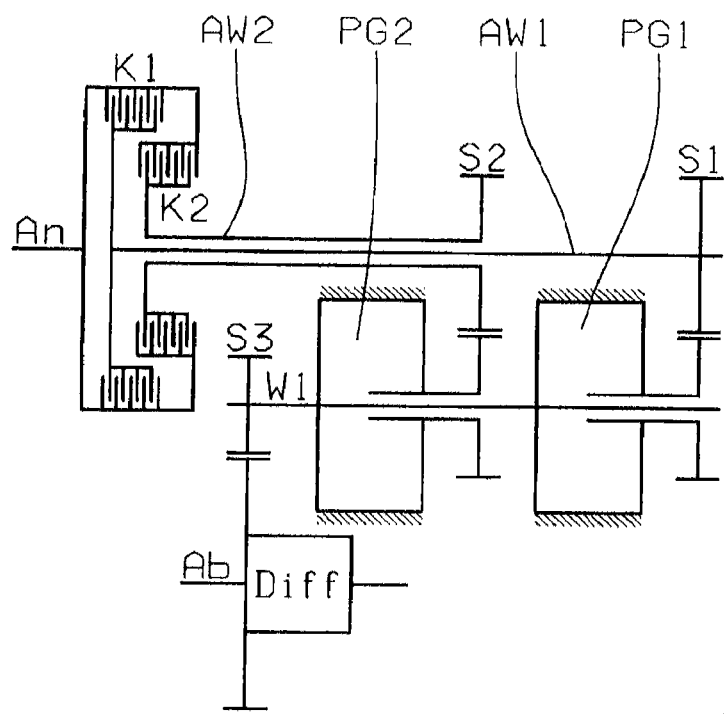
FIG. 19 is a schematic illustration of an eleventh design embodiment of a transmission according to the invention.
Figure 20:
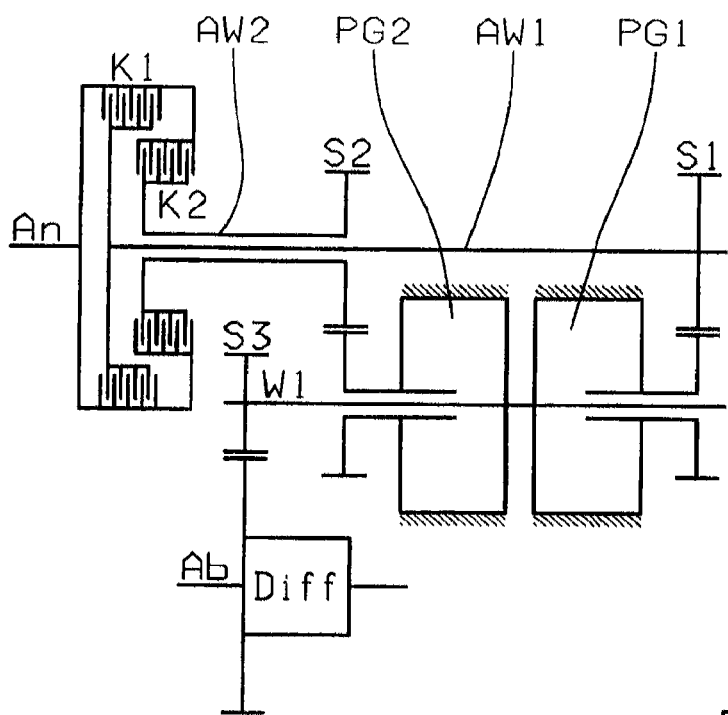
FIG. 20 is a schematic illustration of a twelfth design embodiment of a transmission according to the invention.

In the embodiment shown in FIG. 17, the spur gear stage S2 associated with the planetary transmission PG2 is arranged axially, or, when viewed spatially, is arranged to the right of the planetary transmission PG2, whereas the spur gear stage S1 associated with the planetary transmission PG1 is arranged axially, or, when viewed spatially, is arranged to the left of the planetary transmission PG1. The design embodiment illustrated in FIG. 18 differs from the embodiment shown in FIG. 17 in that the spur gear stage S2 associated with the planetary transmission PG2 is arranged axially, or, when viewed spatially, is arranged to the left of the planetary transmission PG2. Furthermore, FIG. 19 shows a transmission whose design differs from the transmission shown in FIG. 17 in that the spur gear stage S1 associated with the planetary transmission PG1 is arranged axially, or, when viewed spatially, is arranged to the right of the planetary transmission PG1. As an alternative to the arrangements shown in FIGS. 17, 18 and 19, the spur gear stage S2 associated with the planetary transmission PG2 can be arranged axially, or, when viewed spatially, can be arranged to the left of the planetary transmission PG2, and the spur gear stage S1 associated with the planetary transmission PG1 can be arranged axially, or, when viewed spatially, can be arranged to the right of planetary transmission PG1. An arrangement of this kind is the subject matter of FIG. 20.

FIGS. 21, 22, 23 and 24 illustrate design embodiments of a transmission according to the invention, in which the two spur gear stages S1, S2 associated with the planetary transmissions PG1, PG2, are arranged in the direction of force flow, in front of the planetary transmissions PG1 and/or PG2 (that is, the planetary transmissions are connected on the drive side to the corresponding spur gear stage). In this case, the planetary transmissions PG1, PG2 are each arranged on a different intermediate axle W1 and/or W2 parallel to the drive axle. The illustrated design embodiments differ in their spatial arrangement of the spur gear stages S1, S2 relative to the planetary transmissions PG1, PG2.

In the embodiments shown in FIGS. 21, 22, 23 and 24, there is in the direction of force flow after the planetary transmissions PG1, PG2, an additional spur gear stage S3 and/or S4, which establishes the active connection to the output shaft Ab. These spur gear stages S3, S4 can each consist of a drive pinion and a driven wheel. However, in a favorable manner for both spur gear stages, only one single output wheel is used, upon which both pinions act, as shown in FIGS. 21 to 24, whereas the spur gear stages can still be used as two separate transmission ratios.

Figure 21:
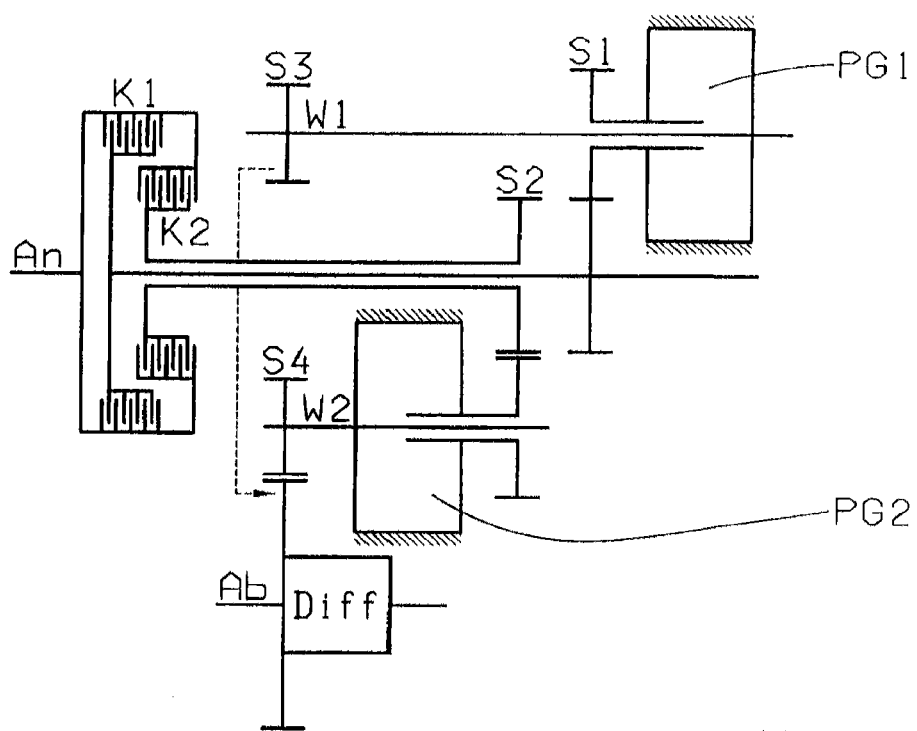
FIG. 21 is a schematic illustration of a thirteenth design embodiment of a transmission according to the invention.
Figure 22:
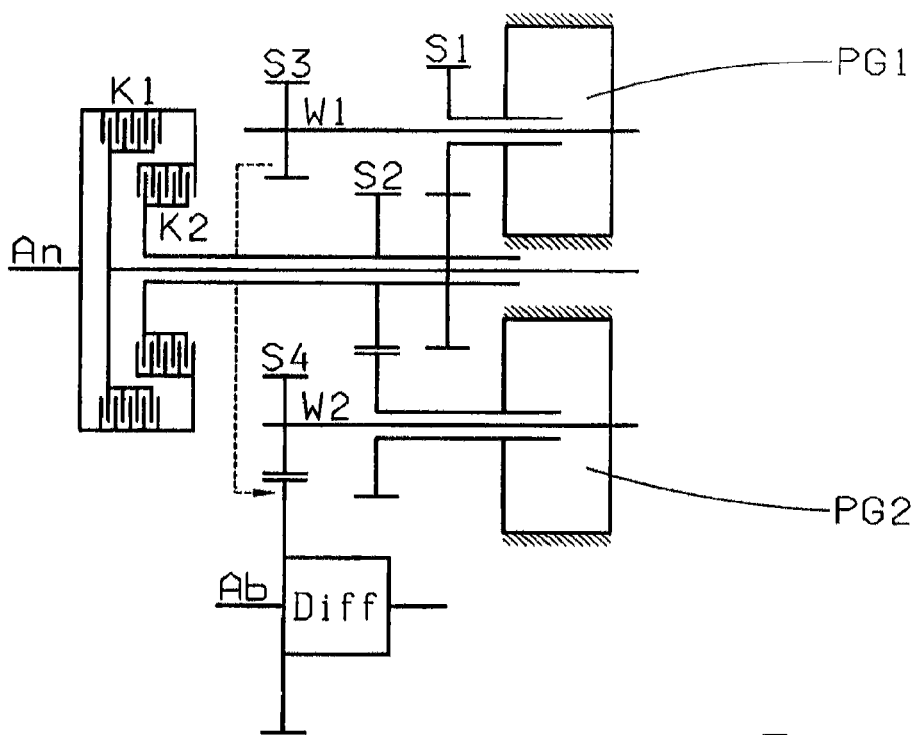
FIG. 22 is a schematic illustration of a fourteenth design embodiment of a transmission according to the invention.

According to FIG. 21, the spur gear stage S2 associated with the planetary transmission PG2 is arranged axially, or, when viewed spatially, is arranged to the right of the planetary transmission PG2, and the spur gear stage S1 associated with planetary transmission PG1 is arranged axially, or, when viewed spatially, is arranged to the left of the planetary transmission PG1. The design embodiment shown in FIG. 22 differs from the embodiment shown in FIG. 17 in that the spur gear stage S2 associated with the planetary transmission PG2 is arranged axially, or, when viewed spatially, is arranged to the left of the planetary transmission PG2.

Figure 23:
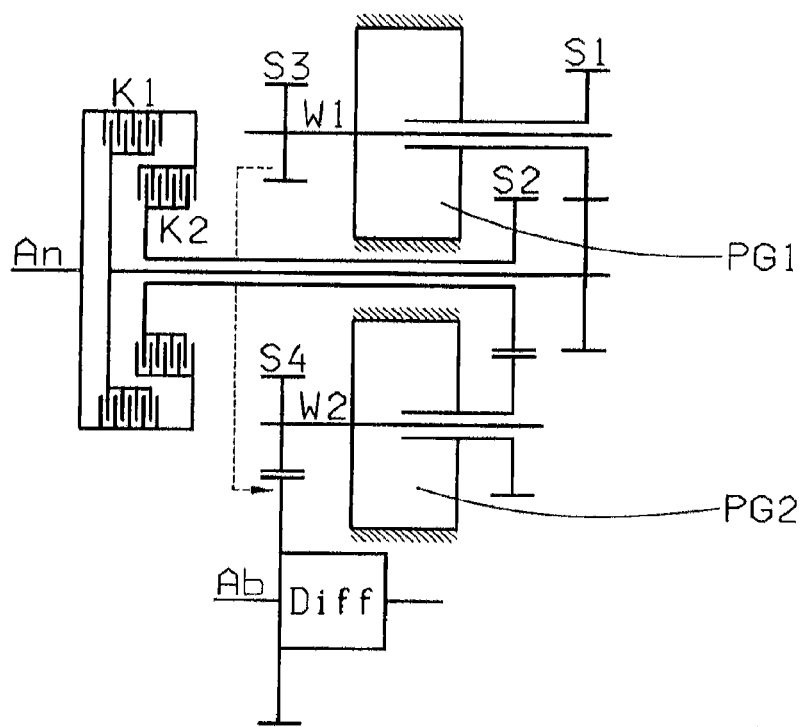
FIG. 23 is a schematic illustration of a fifteenth design embodiment of a transmission according to the invention.
Figure 24:
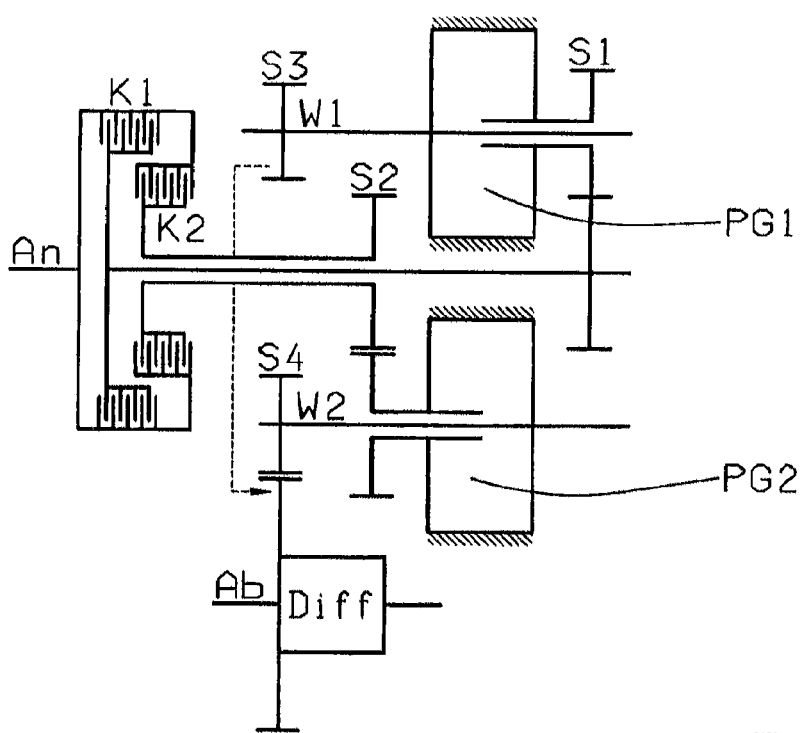
FIG. 24 is a schematic illustration of a sixteenth design embodiment of a transmission according to the invention.

Furthermore, FIG. 23 shows a transmission whose design differs from the transmission shown in FIG. 21 in that the spur gear stage S1 associated with the planetary transmission PG1 is arranged axially, or, when viewed spatially, is arranged to the right of the planetary transmission PG1. Furthermore, according to FIG. 24 as an alternative to the arrangements shown in FIGS. 17, 18 and 19, the spur gear stage S2 associated with the planetary transmission PG2 is arranged axially, or, when viewed spatially, is arranged to the left of the planetary transmission PG2 and the spur gear stage S1 associated with the planetary transmission PG1 is arranged axially, or, when viewed spatially, is arranged to the right of the planetary transmission PG1.

In order to obtain a transmission ratio of the planetary transmission different from a value of 1, bracing on a fixed housing is always needed. This means that a connection is needed between a free shaft of the planetary transmission and the housing. This connection can be established either temporarily. The detachable connection to the housing can be established by means of a synchronizing element, a claw clutch or a disk brake, or the connection can be permanent, that is, the bracing will only come into effect when a second shaft is connected to a third shaft by means of a synchronization element, claw clutch or disk clutch.

A transmission ratio equal to 1 can be obtained in the case of a planetary gear set and/or planetary transmission, while the transmission is bridged, that is, while the drive and the output are connected directly together, or when the transmission is blocked, that is, when two shafts of a planetary gear set are linked together.

To implement additional gears, in particular a reverse gear, these gears can be produced by additional spur gear stages which are connected to a shaft using synchronizing elements according to the prior art.

The establishment of a useful transmission ratio is depicted in the table below based on an organization of the individual transmission ratios.

denoted as phi). Now each one of these transmission ratios can be selected as a direct gear (i=1.0) with the available spur gear transmission ratios. In the columns with headings i_p1' and i_p2', the last gear is selected as a direct gear; in the columns with headings i_p1" and i_p2" the middle gear was selected as a direct gear. The actually required spur gear transmission ratios are presented underneath. However, an additional, final transmission ratio (axle transmission ratio, not illustrated) must be added, in order to obtain the total transmission ratio needed. Based on this calculation, it is evident that, in a simple manner, planetary transmissions can be selected which can satisfy the required transmission ratios.

Figures 25, 26:
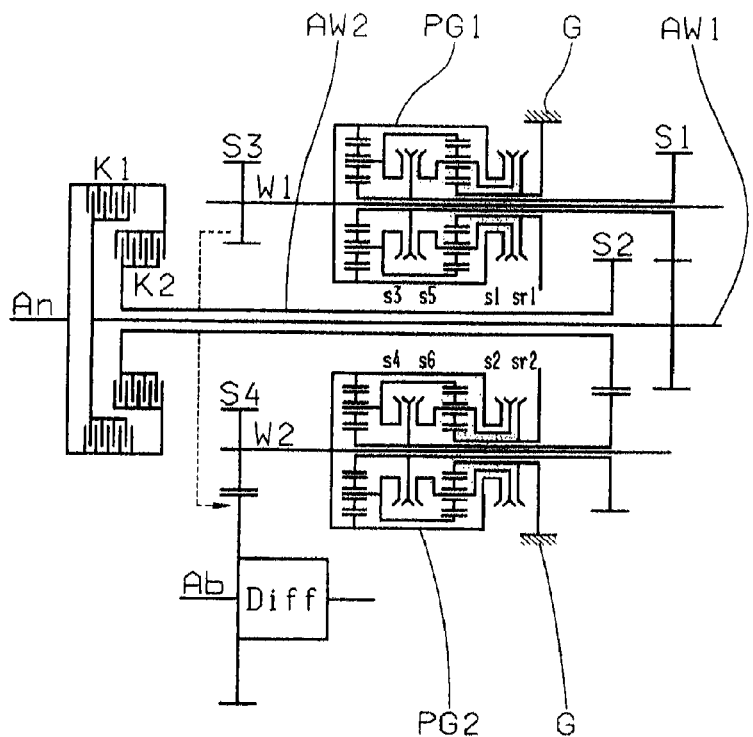
FIG. 25 is a schematic illustration of an additional design embodiment of a transmission according to the invention.
FIG. 26 is a sample shifting diagram containing the transmission ratios for the transmission shown in FIG. 25.

FIG. 25 presents a detailed view of a transmission having the arrangement illustrated in FIG. 23, which is designed as a six-gear transmission with two reverse gears. Both partial planetary transmissions PG1, PG2 have the same design and differ only in their stationary gear ratios. Both partial transmissions each comprise three forward- and one reverse gear; the adaptation of the single transmission ratios to the required total transmission ratio takes place by means of different spur gear stages S1, S2, S3 and S4.

In the figure, the symbols s1, s2, s3, s4, s5 and s6 denote the first, second, third, fourth, fifth and sixth gear, respectively, of the positive shifting elements, which are formed preferably as synchronizing elements. Furthermore, sr1 and sr2 denote the shifting elements necessary for the first and/or the second reverse gear; and G denotes a housing of the transmission.

The planetary transmission PG1, in this case, represents the partial transmission 1 with the uneven-numbered gears and the planetary transmission PG2, in this case, represents the partial transmission 2 with the even-numbered gears. The mode of operation for shifting of the different gears does not differ from the mode of operation of conventional dual clutch transmissions. The individual gears are prepared in the partial transmissions and are shifted by the change of clutch in the dual clutch.

FIG. 26 presents an outline for the transmission shown in FIG. 25. One clutch K1 and/or K2 of the dual clutch, and also one positive shifting element of a partial transmission PG1, PG2 is engaged for each gear. The clutch K1 and/or K2, to be engaged, is associated with the partial transmissions. In the figure, 'x' denotes the shift elements needed for the particular gear, and 'o' denotes the shift elements of the other partial transmission to be prepared for the next higher or next lower gear (for the reverse gears, 'o' also denotes the shift elements needed for the next possible forward gear). The particular transmission ratios i of the individual gear stages and the resultant stage sizes phi can be taken, for example, from the shift table.

The first gear is obtained by engaging the clutch K1 and the shift element s1, second gear by engaging the clutch K2 and

|  | i | phi | i_p1 | i_p2 |  | i_p1' | i_p2' |  | i_p1" | i_p2" |
|---|---|---|---|---|---|---|---|---|---|---|
| 1st gear | 6.00 | 1.71 | 6.00 |  |  | 5.02 |  |  | 2.68 |  |
| 2nd gear | 3.51 | 1.57 |  | 3.51 |  |  | 3.51 |  |  | 2.24 |
| 3rd gear | 2.24 | 1.43 | 2.24 |  |  | 1.87 |  |  | 1.00 |  |
| 4th gear | 1.57 | 1.31 |  | 1.57 |  |  | 1.57 |  |  | 1.00 |
| 5th gear | 1.20 | 1.20 | 1.20 |  |  | 1.00 |  |  | 0.53 |  |
| 6th gear | 1.00 |  |  | 1.00 |  |  | 1.00 |  |  | 0.64 |
|  |  |  |  |  | i_s' = | 1.20 | 1.00 | i_s" = | 1.87 | 1.57 |

In order to obtain the transmission ratio series i with 6 gears and the ratio spread 6, the transmission ratios illustrated in the columns with headings i_p1 and i_p2 have to be divided among the partial transmissions PG1 and PG2 (the step size is the shift element s2, third gear by engaging the clutch K1 and the shift element s3, and fourth gear by engaging clutch K2 and the shift element s4. Furthermore, fifth gear by engaging clutch K1 and shift element s5, and sixth gear by engaging clutch K2 and shift element s6. As is evident from the shifting table, the first reverse gear is engaged by engaging the clutch K1 and shift element sr1, and second reverse gear is engaged by engaging the clutch K2 and the shift element sr2.

Figures 27, 28:
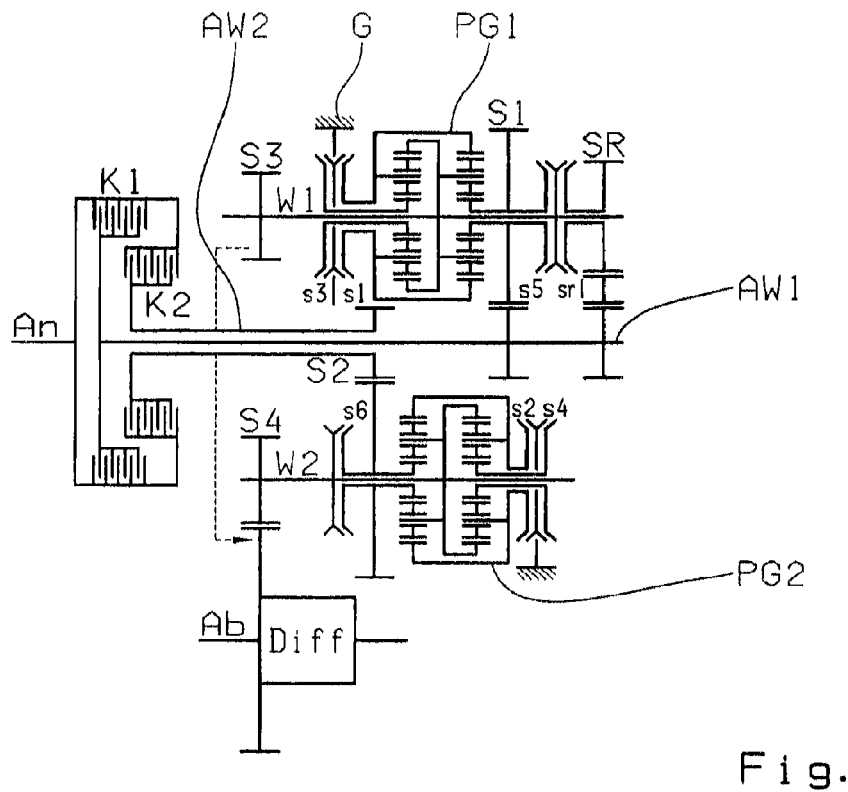
FIG. 27 is a schematic illustration of an additional design embodiment of a transmission according to the invention.
FIG. 28 is a sample shifting diagram containing the transmission ratios for the transmission shown in FIG. 27.

Likewise, FIG. 27 illustrates a six-gear transmission, in which the spur gear stages S1, S2 are arranged in the direction of force flow in front of the planetary transmissions PG1, PG2, and the planetary transmissions PG1, PG2 each are arranged on a different intermediate axle W1 and/or W2 parallel to the drive axle, and both partial planetary transmissions PG1, PG2 have the same design (however, one partial transmission is arranged as a mirror image) and differ only in their stationary gear ratios. As in the transmission illustrated in FIG. 25, after the planetary transmissions PG1, PG2 there is one additional spur gear stage S3 and/or S4, which establishes the active connection to the output shaft Ab. Both partial transmissions PG1, PG2 each comprise three forward gears, and the needed reverse gear is created by means of a spur gear stage SR and a synchronizing element sr1. The adaptation of the single transmission ratios to the required overall transmission ratio, takes place according to the invention by means of different spur gear stages S1, S2, S3 and S4.

FIG. 28 presents a diagram of the transmission illustrated in FIG. 27. For each gear, one clutch K1 and/or K2 of the dual clutch is engaged, as is also a positive shift element of a partial transmission PG1, PG2, to which the clutch K1 and/or K2 is to be engaged. In the figure, 'x' denotes the shift elements needed for the particular gear, and 'o' denotes the shift elements of the other partial transmission to be prepared for the next higher or next lower gear (for the reverse gear, 'o' denotes that shift element needed for the second forward gear). The particular transmission ratios i of the individual gear stages and the resulting stage sizes phi can be found in the table, for example.

The first gear is obtained by engaging the clutch K1 and the shift element s1, second gear by engaging the clutch K2 and the shift element s2, third gear by engaging the clutch K1 and the shift element s3, and fourth gear by engaging clutch K2 and the shift element s4. Furthermore, fifth gear by engaging clutch K1 and shift element s5, and sixth gear by engaging clutch K2 and shift element s6. As is evident from the shifting outline, the reverse gear is engaged by engaging the clutch K1 and shift element sr1.

Due to the design according to the invention, a very compact structural unit is created; due to the short design length, the transmissions disclosed herein are optimal for a front-transverse arrangement; planetary transmissions are characterized by a high specific power density in comparison to countershaft transmissions, and more transmission ratios are possible with fewer elements. Furthermore, a transmission according to the invention is lighter in comparison with conventional dual clutch transmissions with a countershaft design.

Within the scope of additional design embodiments, multi-clutch transmissions with more than two partial transmissions can be used, in which the partial transmissions are designed analogous to the described examples for planetary transmissions.

An additional advantage consists in that the selection of transmission ratio has a wider range than in conventional planetary transmissions, so that the transmission can be adapted to the requirements. Due to the additional spur gear stages, the degree of freedom in selection of the transmission ratio increases, so that the transmission ratio can be selected with a high degree of accuracy, or can be varied in a favorable manner.

Furthermore, a transmission according to the invention can be produced at low cost due to the potential for reuse of parts and has a higher efficiency in comparison to conventional planetary transmissions, since low-loss synchronizing elements are used. In addition, two direct gears can be provided per partial transmission (one direct gear can be implemented in a conventional planetary transmission).

Of course, any other design embodiment, in particular any spatial arrangement of the planetary gear sets and of the shift elements with respect to each other and also where technically feasible, falls under the scope of protection of the claims herein without affecting the operation of the transmission as said operation is stated in the claims, even if these embodiments are not explicitly presented in the figures or in the description.

| List of Reference Symbols | |
|---|---|
| K1 | clutch |
| K2 | clutch |
| PG1 | planetary transmission |
| PG2 | planetary transmission |
| An | drive shaft |
| Ab | output shaft |
| AW1 | solid shaft |
| AW2 | hollow shaft |
| W1 | intermediate shaft |
| W2 | intermediate shaft |
| S1 | spur gear set |
| S2 | spur gear set |
| S3 | spur gear set |
| S4 | spur gear set |
| SR | spur gear set |
| Diff | differential |
| G | housing |
| I | transmission ratio |
| phi | gear step |
| s1 | shift element |
| s2 | shift element |
| s3 | shift element |
| s4 | shift element |
| s5 | shift element |
| s6 | shift element |
| sr1 | shift element |
| sr2 | shift element |

The invention claimed is:

1. A clutch transmission for a front-transverse arrangement comprising a dual clutch and first and second partial transmissions, a first clutch (K1) of the dual clutch is coupled to an input shaft (AW1) of the first partial transmission, a second clutch (K2) of the dual clutch is coupled to an input shaft (AW2) of the second partial transmission, the input shafts (AW1, AW2) of the first and the second partial transmissions are coaxial and the first and the second partial transmissions are respectively a first and a second planetary transmission (PG1, PG2) that are shifted in a positive manner, a transmission drive shaft (An) is connected to both of the first clutch (K1) and the second clutch (K2), and a transmission output shaft (Ab) extends from a same side of the transmission as the transmission drive shaft (An) and is axially parallel to the transmission drive shaft (An), in a common rotational direction, torque being transmitted to the transmission output shaft (Ab) by at least one intermediate shaft (W1, W2) which extends parallel to the input shafts (AW1, AW2) of the first and the second partial transmissions.

2. The dual clutch transmission according to claim 1, wherein the first and the second planetary transmissions (PG1, PG2) comprise at least one planetary gear set which has a conventional design.

3. The dual clutch transmission according to claim 2, wherein the planetary gear sets are multiple-stage planetary gear sets.

4. The dual clutch transmission according to claim 1, wherein the first and the second planetary transmissions (PG1, PG2) are shifted by one of synchronizing elements or claw clutches.

5. The dual clutch transmission according to claim 1, wherein individual gears in the first and the second planetary transmissions (PG1, PG2) are prepared and shifted by adjustment of the first and the second clutches in the dual clutch, and each of the first and the second planetary transmissions (PG1, PG2) has at least one-half minus one of forward gears of the dual clutch transmission, and one of the first and the second planetary transmissions (PG1, PG2) comprises even-numbered gears and the other of the first and the second planetary transmissions (PG1, PG2) comprises uneven-numbered gears.

6. The dual clutch transmission according to claim 1, wherein reverse gears are engaged by engaging one shift element of the first and the second planetary transmissions or a spur gear set and a positive shifting element.

7. The dual clutch transmission according to claim 1, wherein the first and the second partial transmissions (PG1, PG2) have a common design.

8. The dual clutch transmission according to claim 1, wherein at least one spur gear set (S1, S2) is associated with each of the first and the second planetary transmissions (PG1, PG2), and the spur gear set is either located axially, or, when viewed spatially, to a left or a right in front of the first or the second planetary transmission (PG1, PG2) associated therewith.

9. The dual clutch transmission according to claim 8, wherein the spur gear sets (S1, S2) are connected to the input shafts (AW1, AW2) of the first and the second planetary transmissions after the first and the second planetary transmissions (PG1, PG2) in a direction of power flow.

10. The dual clutch transmission according to claim 8, wherein the spur gear sets (S1, S2) are located in front of the first and the second planetary transmissions (PG1, PG2) in a direction of power flow, and the first and the second planetary transmissions (PG1, PG2) are located either on a common intermediate shaft (W1), which is parallel to the transmission drive shaft, or on two independent parallel intermediate shafts (W1, W2).

11. The dual clutch transmission according to claim 9, wherein two additional spur gear sets (S3, S4) are provided in order to ensure linkage of additional intermediate shafts (W1, W2) to the output shaft (Ab).

12. The dual clutch transmission according to claim 10, wherein the spur gear sets of the first and the second planetary transmissions (PG1, PG2) each comprise a drive pinion and a driven wheel.

13. The dual clutch transmission according to claim 12, wherein each of the spur gear sets has a single driven wheel, upon which both of the drive pinions act, and the spur gear sets are used as two separate transmission ratios.

14. The dual clutch transmission according to claim 8, wherein a first spur gear set (S1, S2) is located in a direction of power flow, in front of the first or the second planetary transmission (PG1, PG2) associated therewith, and a second spur gear set (S1, S2) is located in the direction of power flow after the first or the second planetary transmission (PG1, PG2) associated therewith, and the first or the second planetary transmission whose associated spur gear set is located, in the direction of power flow, in front of the first or the second planetary transmission, is located on the intermediate shaft (W1) parallel to the input shaft of the first or the second planetary transmission.

15. The dual clutch transmission according to claim 8, wherein if the dual clutch transmission has a single intermediate shaft (W1), an additional spur gear set (S3) links the intermediate shaft (W1) to the transmission output shaft (Ab).

16. The dual clutch transmission according to claim 1, wherein the dual clutch transmission is a dual clutch module or an independent dual clutch which comprises two clutches located at different positions in the transmission.

17. The dual clutch transmission according to claim 1, wherein a power flow from an engine proceeds by one of a hydraulic torque converter and a hydraulic clutch for reduction of rotary oscillation.

18. The dual clutch transmission according to claim 1, wherein at least one output wheel is linked to a differential (Diff) such that speed compensation is ensured between one of right and left driven wheels (for a pure front-drive) or front and rear axles (for all-wheel drive).

19. A dual clutch transmission for a front-transverse arrangement, the dual clutch transmission comprising:
  an input shaft (An) of the dual clutch transmission being coupled to each of a first clutch (K1) and a second clutch (K2);
  a first planetary transmission (PG1) being coupled, via a first transmission shaft (AW1), to the first clutch (K1) such that the first planetary transmission (PG1) is connectable with the input shaft (An) of the dual clutch transmission;
  a second planetary transmission (PG2) being coupled, via a second transmission shaft (AW2), to the second clutch (K2) such that second planetary transmission (PG2) is connectable with the input shaft (An) of the dual clutch transmission;
  the first transmission shaft (AW1), the second transmission shaft (AW2), the first clutch (K1) and the second clutch (K2) are each coaxial with the input shaft (An) of the dual clutch transmission;
  at least one intermediate shaft (W1, W2) being parallel to each of the first transmission shaft (AW1), the second transmission shaft (AW2) and the input shaft (An) of the dual clutch transmission;
  an output shaft (Ab) of the dual clutch transmission being parallel to each of the first transmission shaft (AW1), the second transmission shaft (AW2), the input shaft (An) of the dual clutch transmission and the at least one intermediate shaft (W1, W2) and the output shaft (Ab) of the dual clutch transmission communicates with the at least one intermediate shaft (W1, W2) to receive drive therefrom; and
  the transmission input shaft (An) and the transmission output shaft (Ab) of the dual clutch transmission extending therefrom on a common side of the dual clutch transmission.

* * * * *